United States Patent Office 3,773,830
Patented Nov. 20, 1973

3,773,830
N-AROYL-N'-(ALKYLHYDROXYPHENYL) ALKANOYLHYDRAZINES
Martin Dexter, Briarcliff Manor, N.Y., assignor to Ciba-Geigy Corporation, Ardsley, N.Y.
No Drawing. Continuation-in-part of application Ser. No. 28,048, Apr. 4, 1970, now Patent No. 3,660,438. This application Mar. 2, 1972, Ser. No. 231,391
Int. Cl. C07c 103/30
U.S. Cl. 260—559 H          8 Claims

ABSTRACT OF THE DISCLOSURE

N-benzoyl N'-(alkylhydroxyphenyl)alkanoylhydrazine compounds having the formula

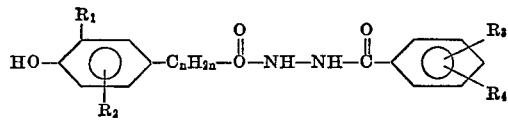

wherein
$R_1$ is a lower alkyl group,
$R_2$ is hydrogen or a lower alkyl group,
$R_3$ and $R_4$ are independently hydrogen, alkyl, alkoxy or halogen and
$n$ is 0 to 5,
are prepared by reacting an ester of an alkylhydroxyphenylalkanoic acid or the corresponding acid chloride with hydrazine and the resulting hydrazide is then reacted with a benzoyl chloride. These compounds are useful as stabilizers of organic materials which are subject to oxidative deterioration.

---

This invention is a continuation-in-part of copending application Serial No. 28,048, filed Apr. 4, 1970, now U.S. Patent 3,660,438.

DETAILED DESCRIPTION

This invention relates to novel N-benzoyl and benzoyl substituted-N'-(alkylhydroxyphenyl)alkanoyl - hydrazines which are useful as stabilizers of organic materials which are subject to oxidative deterioration and as metal deactivators. When these compounds are incorporated in an organic material, either alone or in combination with other stabilizers or synergists, the organic material, especially polyolefin, will be protected against oxidative and/or thermal deterioration.

The novel compounds of the present invention are represented by the formula:

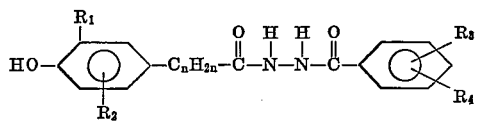

wherein
$R_1$ is an alkyl group containing from 1 to 6 carbon atoms,
$R_2$ is hydrogen or an alkyl group containing from 1 to 5 carbon atoms,
$R_3$ and $R_4$ are independently hydrogen, alkyl, alkoxy or halogen, where the alkyl group has up to 18 carbon atoms, and
$n$ is an integer from 0 to 5.

Illustrative examples of lower alkyl groups that are substituted on the phenol moiety are methyl, ethyl, propyl, isopropyl, butyl, t-butyl, t-amyl and the like. The preferred groups are the tertiary alkyls. Illustrative examples of the higher alkyl groups are heptyl, octyl, decyl, dodecyl, tetradecyl, hexadecyl, octadecyl and the like, both straight chain and branched chain.

The novel compounds of the present invention are prepared by a procedure involving the reaction between hydrazine and either an ester of an alkylhydroxyphenylalkanoic acid or the corresponding acid halide represented by the formula:

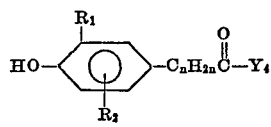

wherein
$R_1$ and $R_2$ are as defined above and
Y is an alkoxy group or a halogen.

The resulting hydrazide is then reacted with an aromatic acid chloride to yield the compounds of this invention.

The alkylhydroxyphenylalkanoic acids and the esters thereof that are used as starting materials are described in U.S. Pat. 3,330,859. Some of the procedures used in the syntheses of said acids and their esters include the reaction of alkali metal salts of an alkylated phenol with methyl acrylate; the reaction of alkali metal salts of alkylated phenols with esters of -haloalkanoic acids; the reaction of alkylhydroxybenzyl chlorides with alkali metal cyanides to obtain alkylhydroxyphenylacetonitriles followed by hydrolysis to the acids.

The lower alkyl esters of these alkylhydroxyphenylalkanoic acids, when reacted with hydrazine, yield a monoacylhydrazine. The aforesaid esters can be hydrolyzed with a strong base, such as sodium hydroxide, to yield the sodium salt of the corresponding acid. The sodium salt may be converted to the free acid by conventional procedures, that is, by acidification with a mineral acid. The acids are converted to the acid chlorides by reacting them with thionyl chloride or other conventional chlorinating agents. When the acid chloride method is employed to prepare the intermediates, at least one mole excess of hydrazine should be used, and preferably even a larger excess.

The reaction can be conducted in the presence of a solvent that is inert with respect to the reactants and the product. Useful solvents include, for example, methylene chloride, chloroform, benzene, toluene and the like.

The following examples detail the preparation of the compounds of the present invention and are therefore to be considered as illustrative but not limiting the invention.

EXAMPLE 1

Preparation of β-(3,5-di-t-butyl-4-hydroxyphenyl) propionyl hydride 53.8 g. (1.07 mol) of hydrazine hydrate was dissolved in 600 ml. absolute methanol and to this solution was added, with stirring, 71.8 g. (0.25 mol) of methyl β-(3,5-di-t-butyl-4-hydroxyphenyl)propionate. The mixture was allowed to stand at room temperature for 48 hours. The methanol was removed by distillation, under a nitrogen atmosphere, and 500 mls. of water was added to the residue. After stirring for one hour, a white crystalline material was obtained and was separated by filtration. There was obtained a yield of 71.7 g. of the product, β-(3,5-di-t-butyl-4-hydroxyphenyl)propionyl hydrazide melting between 154°–155.5° C. On recrystallization from a mixture of ethanol and water, a melting point of 155.5°–156.5° C. was noted.

*Analysis.*—Calcd. (percent): C, 69.8; H, 9.7; N, 9.6. Found (percent): C, 69.7; H, 9.5; N, 9.8.

EXAMPLE 2

Preparation of N-benzoyl-N'-3-(3',5'-di-tert-butyl-4'-hydroxyphenyl)-propionylhydrazine 8.8 g. of β-(3,5-di-t-butyl-4-hydroxyphenyl)propionylhydride prepared in Example 1, was placed in a reaction vessel and dissolved with 35 ml. of pyridine. To this mixture was added dropwise, 4.6 g. of benzoyl chloride. The reaction mixture was permitted to stand overnight and then filtered. To the filtrate was added 75 ml. of water which caused the formation of an oil layer which, on standing, solidified. The solid was filtered and washed four times with water and dried in vacuum over $P_2O_5$ yielding 11.4 g. of crude product. The dried material was dissolved in 62.5 ml. of 80 percent ethanol-water, filtered and the product, on cooling, crystallized. The purified product was dried in vacuum over $P_2O_5$ yielding 9.36 g. of material melting at 169°–170° C. NMR spectrum confirmed the structure of the product.

*Analysis.*—Calcd. (percent): C, 69.8; H, 9.7; N,9.6. Found (percent): C, 69.7; H, 9.5; N, 9.8.

EXAMPLE 3

Preparation of N-p-dodecyloxybenzyl-N'-3(3',5'-di-tert-butyl-4'-hydroxyphenyl)-propionylhydrazine Following the procedure of Example 2, 8.8 g. of β-(3,5 - di-t-butyl-4-hydroxyphenyl)propionhydrazide is reacted with 10.7 g. of p-dodecyloxybenzoyl chloride yielding the above named product.

EXAMPLE 4

Preparation of N-(2,4-dimethylbenzoyl)-N',3'(3'',5''-di-tert-butyl-4''-hydroxyphenyl)-propionylhydrazine According to the procedure of Example 2, 8.8 g. of β-(3,5-di-t-butyl-4-hydroxyphenyl)propionhydrazide is reacted with 5.6 g. of 2,4-dimethylbenzoyl chloride yielding the above product.

EXAMPLE 5

Preparation of N-(2,4-dichlorobenzoyl)-N'-3'(3'',5''-di-tert-butyl-4''-hydroxyphenyl)-propionylhydrazine Following the procedure according to Example 2, 8.8 g. of β-(3,5-di-t-butyl-4-hydroxyphenyl)propionhydrazide prepared in Example 1 is reacted with 6.9 g. of 2,4-dichlorobenzoyl chloride yielding the above named product.

EXAMPLE 6

Preparation of N-benzoyl-N'-3'(3'-methyl5'-t-butyl-4'-hydroxyphenyl)propionylhydrazine Following the procedure of Example 2, 7.5 g. of β-(3-methyl-5-t-butyl-4-hydroxyphenyl)propionhydrazide is reacted with 4.6 g. of benzoyl chloride to yield the above named compound.

EXAMPLE 7

Preparation of N-benzoyl-N'-(3',5'-di-t-butyl-4'-hydroxybenzoyl)hydrazine

Following the procedure of Example 2, 7.9 g. of 3,5-di-t-butyl-4-hydroxybenzoylhydrazide (which is prepared by reacting methyl 3,5-di-t-butyl-4-hydroxybenzoate chloride with hydrazine) is reacted with 4.6 g. of benzoyl chloride to yield the above named product.

Also following the procedure of Example 2, the reaction between β-(3,5-dimethyl-4-hydroxyphenyl)propionhydrazide and p-methylbenzoyl chloride yield N(p-methylbenzoyl)-N'-3'(3',5' - di-t-butyl - 4' - hydroxyphenyl)propionylhydrazine, the reaction between β-(3,5-di-t-amyl-4-hydroxyphenyl)propionhydrazide and p-ethoxybenzoyl chloride yield N(p-ethoxybenzoyl)-N'-3'(3',5'-di-t-amyl-4'-hydroxyphenyl)propionylhydrazine, the reaction between δ - (3,5 - di-t-butyl - 4 - hydroxyphenyl)pentahydrazide and benzoyl chloride yield N-benzoyl-N'-5(3', 5'-di-t-butyl-4'-hydroxyphenyl)-pentahydrazine and the reaction between β-(3-t-butyl-4-hydroxyphenyl)propion- hydrazide and benzoyl chloride yield N-benzoyl-N'-3(3'-t-butyl-4'-hydroxyphenyl)propionhydrazide.

The active compounds of the present invention are useful as stabilizers of organic materials normally subject to oxidative deterioration. Such organic materials include: synthetic organic polymeric substances such as vinyl resins formed from the polymerization of vinyl halides or from the copolymerization of vinyl halides with unsaturated polymerizable compounds, e.g., vinyl esters, unsaturated hydrocarbons such as butadienes and styrene; polyolefins such as polyethylene, polypropylene, polybutylene; diolefin polymers such as polybutadiene, polyisoprene, and the like, olefin copolymers such as ethylethane-propylene copolymer, ethylene-propylene-diene copolymer; polyurethanes and polyamides such as polyhexamethylene adipamide and polycaprolactam; polyesters such as polyethylene terephthalates; polycarbonates; polyacetals; polystyrene; polyethyleneoxide; and copolymers such as those of high impact polystyrene containing copolymers of butadiene and styrene and those formed by the copolymerization of acrylonitrile, butadiene and/or styrene. Other materials which can be stabilized by the active compounds of the present invention include lubricating oil of the aliphatic ester type, i.e., di(2-ethylhexyl)-azelate, pentaerythritol tetracaproate, and the like; animal and vegetable derived oils, e.g., linseed oil, fat, tallow, lard, peanut oil, cod liver oil, castor oil, palm oil, corn oil, cottonseed oil, and the like; hydrocarbon materials such as gasoline, mineral oil, fuel oil, drying oil, cutting fluids, waxes, resins, and the like, fatty acids such as soaps and the like.

In general one or more of the stabilizers of the present invention are employed in amounts, in toto, of from about 0.005 to about 5% by weight of the composition containing the organic material. A particularly advantageous range of the present stabilizers for polyolefins such as polypropylene is from about 0.05% to about 2%.

The stabilizers employed in this invention can be also used in combination with other stabilizers or additives. Especially useful co-stabilizers are dilauryl-beta-thiodipropionate and di-stearyl-beta-thiodipropionate.

The following formula represents co-stabilizers which are in certain instances very useful in combination with the stabilizers of this invention:

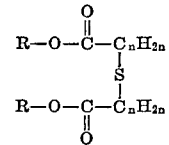

wherein R is an alkyl group having from 6 to 24 carbon atoms; and $n$ is an integer from 1 to 6. The above co-stabilizers are used in the amount of from 0.01 to 2% by weight of the organic material, and preferably from 0.1 to 1%.

Other antioxidants, antiozonants, thermal stabilizers, ultraviolet light absorbers, coloring materials, dyes, pigments, metal chelating agents, etc. may also be used in the compositions of the invention.

Since the oxidation of organic materials is slow at ambient temperatures, even in the absence of antioxidants, the testing of the effects of antioxidants must be conducted at high temperatures in order to obtain results within a convenient time. The tests conducted on the following material were made following oven aging in a tubular oven, with an air flow of 400 feet per minute at a temperature of 150° C.

EXAMPLE 8

A batch of unstabilized polypropylene powder (Hercules Profax 6501) was thoroughly blended with 0.1% by weight of N-benzoyl-N'-(3',5'-di-t-butyl-4'-hydroxyphenyl)-propionyl-hydrazine and 0.3% of distearylthiodipropionate (DSTDP). The blended materials were then milled on a two-roller mill at 182° C., for ten minutes, after which time the stabilized polypropylene was sheeted from the mill and allowed to cool.

The milled polypropylene sheets were then cut into pieces and pressed for seven minutes on a hydraulic press at 218° C. and 2,000 pounds per square inch pressure. The resultant sheets of 25 mil thickness were tested for resistance to accelerated aging in a forced draft oven at 150° C. This composition started to decompose after 325 hours. Unstabilized polypropylene decomposes after 3 hours and polypropylene stabilized with 0.3% of DSTDP decomposes after 50 hours.

Using the procedure of Example 8, polypropylene is also stabilized with the following compounds:

(a) N-p-dodecyloxybenzoyl-N'-3(3'.5'-di-tert-butyl-4'-hydroxyphenyl)-propionylhydrazine
(b) N-(2,4-dimethylbenzoyl)-N'-3'(3'',5''-di-tert-butyl-4''-hydroxyphenyl)-propionylhydrazine
(c) N(2,4-dichlorobenzoyl)-N'-3'(3'',5''-di-tert-butyl-4''-hydroxyphenyl)-propionylhydrazine
(d) N-benzoyl-N'-3'(3'-methyl-5'-t-butyl-4'-hydroxyphenyl)-propionylhydrazine
(e) N-benzoyl-N'(3',5'-di-t-butyl-4'-hydroxybenzoyl)-hydrazine.

In addition to the antioxidant properties, the compounds of this invention are also useful as metal deactivators. This utility is of utmost importance in commercial applications because it is generally known that the decomposition of polymers, especially polyolefins such as polyethylene or polypropylene, is catalyzed by metals such as copper. The metal may be present in a polyolefin in the form of finely divided particles carried over from the polymerization catalyst or the polyolefin may be in contact with a metal when the polymer is used as a wire coating.

What is claimed:
1. A compound having the formula

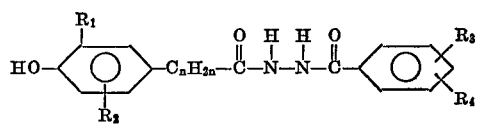

wherein $R_1$ and $R_2$ are alkyl groups having from 1 to 5 carbon atoms, $R_3$ and $R_4$ are independently of each other hydrogen, chloride or alkoxy groups having up to 18 carbon atoms, and $n$ is an integer from 0 to 5.

2. A compound of claim 1, wherein $R_1$ and $R_2$ are tert-butyl groups.

3. A compound of claim 2, wherein $n$ is 2.

4. The compound of claim 1 which is N-benzoyl-N'-3(3',5'-di-tert-butyl-4'-hydroxyphenyl) - propionylhydrazine.

5. The compound of claim 1 which is N-p-dodecyloxybenzoyl - N' - 3(3',5' - di-tert-butyl-4'-hydroxyphenyl)-propionylhydrazine.

6. The compound of claim 1 which is N(2,4-dichlorobenzoyl) - N' - 3'(3'',5''-di-tert-butyl-4''-hydroxyphenyl)-propionylhydrazine.

7. The compound of claim 1 which is N-benzoyl-N'-3'-(3' - methyl - 5' - t - butyl-4'-hydroxyphenyl)propionylhydrazine.

8. The compound of claim 1 which is N-benzoyl-N'-(3',5'-di-t-butyl-4'-hydroxybenzoyl)hydrazine.

References Cited
FOREIGN PATENTS
2,040,089    1/1971    France _____ 260—559

HARRY I. MOATZ, Primary Examiner

U.S. Cl. X.R.
260—45.9 R; 252—403